(12) United States Patent
Büdicker et al.

(10) Patent No.: US 10,302,147 B2
(45) Date of Patent: May 28, 2019

(54) CLUTCH DISK FOR A MOTOR VEHICLE

(71) Applicant: ZF FRIEDRICHSHAFEN AG, Friedrichshafen (DE)

(72) Inventors: Kai Büdicker, Massbach (DE); Bernd Förster, Dittelbrunn (DE); Dominik Bühl, Eltmann (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 90 days.

(21) Appl. No.: 15/497,631

(22) Filed: Apr. 26, 2017

(65) Prior Publication Data

US 2017/0321762 A1    Nov. 9, 2017

(30) Foreign Application Priority Data

May 3, 2016   (DE) .................. 10 2016 207 627

(51) Int. Cl.
*F16D 13/64* (2006.01)
*F16D 13/68* (2006.01)

(52) U.S. Cl.
CPC ............. *F16D 13/64* (2013.01); *F16D 13/68* (2013.01); *F16D 2013/642* (2013.01); *F16D 2300/22* (2013.01)

(58) Field of Classification Search
None
See application file for complete search history.

(56) References Cited

U.S. PATENT DOCUMENTS

| | | | | | |
|---|---|---|---|---|---|
| 2,502,653 | A | * | 4/1950 | Kelleher | ................. F16D 13/64 192/107 C |
| 2,658,598 | A | * | 11/1953 | Vincent | ................... F16D 13/64 192/107 C |
| 4,260,048 | A | * | 4/1981 | Beccaris | ................. F16D 13/64 192/107 C |
| 5,413,202 | A | * | 5/1995 | Maucher | ................ B60K 17/02 192/107 C |

FOREIGN PATENT DOCUMENTS

| | | |
|---|---|---|
| DE | 19529074 | 9/1996 |
| DE | 10238365 | 3/2004 |
| GB | 2257209 | 1/1993 |

* cited by examiner

*Primary Examiner* — Mark A Manley
(74) *Attorney, Agent, or Firm* — Cozen O'Connor (57) ABSTRACT

A clutch disk (10) for a motor vehicle includes at least two axially opposed friction linings (18), a lining spring (16) and a drive carrier disk (14) with a spring window (24), wherein the lining spring (16) has at least one fastening portion (16*a*), a supporting portion (16*b*) and a plurality of spring segments (16*c*) arranged adjacent to one another in circumferential direction, and the spring segments (16*c*) are arranged radially outside at the supporting portion (16*b*) of the lining spring (16), and the fastening portion (16*a*) is arranged radially inside at the supporting portion (16*b*).

7 Claims, 4 Drawing Sheets

CLUTCH DISK FOR A MOTOR VEHICLE

FIELD OF THE INVENTION

The present invention is directed to a clutch disk for a motor vehicle and to a lining spring for a clutch disk of this type.

DESCRIPTION OF THE RELATED ART

DE 102 38 365 A1, the entire content of which is incorporated herein by reference, discloses a clutch disk with a plurality of lining springs. The lining spring has two spring segments which are connected to one another via a web running along a surface of a drive carrier disk. Fastening openings which serve for fixedly connecting to the drive carrier disk are formed inside the web. Each of the spring segments is connected via rivets to two axially opposed friction disks. The spring segments are connected to a fastening portion forming the fastening openings along only a relatively narrow supporting portion which forms part of the web. The supporting portion which is only narrow receives high loads. Torques occurring at the clutch disk additionally cause corresponding torsional forces which must be absorbed by the lining springs arranged in the center between two spring windows.

Further, DE 195 29 074 C1, the entire content of which is incorporated herein by reference, shows a clutch disk with another lining spring. This lining spring is likewise connected to a drive carrier disk via fastening openings and cooperates with the friction linings via spring segments. The connection of the spring segments to the fastening portion is substantially wider in circumferential direction and is therefore more stable. The spring segments have different bending shapes in order to realize different axial forces.

Therefore, it is an object of the present invention to provide a clutch disk with an improved lining spring.

SUMMARY OF THE INVENTION

The present invention is directed to a clutch disk for a motor vehicle which comprises at least two axially opposed friction linings, at least one lining spring and a drive carrier disk. The friction linings are arranged axially at both sides of the lining spring. They can be constructed, for example, so as to be circularly or annularly closed. The lining spring is advantageously fastened to the drive carrier disk and is arranged radially outside of the drive carrier disk. The friction linings are also advantageously arranged radially outside of the drive carrier disk. In particular, the friction linings and the drive carrier disk are constructed such that there is no radial overlap. The friction linings preferably overlap in radial direction at least with spring segments of the lining spring. A plurality of lining springs extending in circumferential direction is advantageously arranged radially outwardly at the drive carrier disk.

Further, the clutch disk advantageously has a torsion damper for which the drive carrier disk serves as input element. The drive carrier disk is operatively connected to an output element, in particular side plates of the clutch disk, via spring elements.

A lining spring has a fastening portion, a supporting portion and a plurality of spring segments arranged adjacent to one another in circumferential direction.

The fastening portion, or fastening portions, serves to fasten the lining spring to the drive carrier disk. At least one fastening opening correlating to an opening of the drive carrier disk is advantageously formed at the fastening portion in order to provide a fixed connection via a fastening element, particularly a rivet.

The spring segments enable an axial relative movement of the friction linings with respect to one another and provide a force characteristic which rises in a progressive manner. The friction linings are arranged axially on both sides of the spring segment. In a particularly advantageous manner, a friction lining is fixedly connected to at least one spring segment via fastening element, in particular one or more rivets. The spring segments advantageously have a plurality of working portions which are formed so as to be axially offset relative to one another and serve as abutting surfaces for the friction linings. Accordingly, a bending portion located between two working portions first takes effect when the working surfaces come into abutting contact with contact surfaces of the friction linings.

The spring segments are further connected to the fastening portions via at least one supporting portion. In particular, the supporting portion is formed between a spring segment and a fastening portion. All of the spring segments are advantageously arranged at the same supporting portion. In addition, the spring segments are advantageously arranged radially outside of the fastening portions. The friction linings preferably overlap the spring segments completely in radial direction. In other words, the spring portions are completely covered axially by the friction linings.

It is suggested that the supporting portion extends between two fastening portions so as to run in circumferential direction.

The supporting portion accordingly forms a radial connection between the spring segments and the fastening portions and a connection extending in circumferential direction between the fastening portions themselves. When a plurality of fastening portions are used, two of the fastening portions are arranged at the respective circumferential end of the lining spring in a particularly advantageous manner. This is particularly advantageous because an improved support of the drive carrier disk is carried out in this way. In particular, the forces introduced into the friction linings are better absorbed by the lining spring as a result of arranging the fastening portions so as to be spaced apart circumferentially. In particular, the resistance of the lining spring relative to impinging torsional loads is substantially reduced.

In a particularly advantageous manner, the drive carrier disk has a spring window, and the supporting portion is arranged radially outwardly at the spring window, or the two fastening portions are arranged opposite one another in circumferential direction at the spring window.

The lining spring is substantially formed so as to run along the spring window radially outwardly and in circumferential direction. The lining spring covers a relatively large angular area on the clutch disk, and the fastening portions are spaced far apart from one another in circumferential direction. The strength and stability of the lining spring is substantially improved in this way. In particular, torsional action on the lining spring is substantially reduced and the forces brought about are introduced and distributed uniformly over the drive carrier disk.

In a particular embodiment, a fastening portion has at least two, particularly four, fastening openings for receiving a fastening element.

On the one hand, this facilitates the introduction of force into the drive carrier disk; on the other hand, a reliable transmission is ensured. In particular, it can happen that a fastening element, for example, a rivet, comes loose during operation and accordingly loses its fastening function. Therefore, the use of a plurality of fastening elements provides greater redundancy.

The spring window of the drive carrier disk is preferably bounded radially outwardly by a web, and the supporting portion of the lining spring covers the web at least partially in radial direction.

The supporting portion of the lining spring is arranged axially laterally of, or at an axial surface of, the drive carrier disk. The supporting portion abuts the web and an axial load or an axially introduced force through the friction linings on the lining spring can be better supported in this way and can be conducted to the drive carrier disk. In this respect, it is advantageous that the overlapping of the supporting portion with the web is particularly extensive.

Further, it is suggested that the supporting portion overlaps the web by at least fifty percent, by two thirds, or completely. The supporting action is further improved in this way. Accordingly, in particular, the lining spring cannot sag axially.

In addition, a lining spring is suggested for a clutch disk or for use in a clutch disk according to one of claims 1 to 6 or according to at least one of the embodiments in the description.

Additional variants of the lining spring are explained hereinafter.

It is suggested that the lining spring has at least three spring segments.

The spring segments are advantageously formed adjacent to one another in circumferential direction at the lining spring. In particular, a cutout which advantageously runs in radial direction is formed between the spring segments. This radial direction effectively separates the spring segments from one another so that adjacent spring segments do not mutually influence one another substantially during an axial compression of the lining spring. Accordingly, the spring segments can supply different spring forces independently of one another.

A spring segment can be arranged, for example, radially outside of a fastening portion. Alternatively, a spring segment is arranged exclusively radially outside of a spring window at a supporting portion and is formed between two fastening portions in circumferential direction.

In a further embodiment, the spring force of a spring segment located in the center in circumferential direction is greater than the spring force of a spring segment located on the outside in circumferential direction.

In particular, a spring force of all of the spring segments located in the center is greater in each instance than the spring force of the two spring segments located on the outside in circumferential direction. In this respect, the spring forces or spring constants of a plurality of spring segments located in the center may also differ. In particular, the introduction of force into the lining spring is improved in this way. With a force characteristic rising in a progressive manner during an axial compression of the lining spring, the spring segments or even individual bending portions can take effect in ascending order starting with that having the smallest spring constant.

It is further proposed that initially a spring segment located on the outside in circumferential direction acts on the lining spring, subsequently the other spring segment located on the outside in circumferential direction acts on the lining spring and, after the latter, a spring segment located on the inside in circumferential direction acts on the lining spring.

A torsional effect on the lining spring through the force introduced proceeding from the friction linings can be improved in this way. In particular, the spring segments located on the outside in circumferential direction are connected via the supporting portion substantially directly and by the shortest path to the fastening portions, where initially occurring forces can be optimally absorbed by the drive carrier disk and the fastening portion. If the center spring segment were to act first, the load on the supporting portion in the form of a torsional effect would be substantially greater. Accordingly, stresses occurring within the lining spring in particular can be effectively reduced or minimized.

According to a further embodiment, it is advisable that every spring segment has at least a first working portion and a second working portion for contacting the axially opposed friction linings, which first working portion and second working portion form an axial working distance relative to one another, and an axial working distance of a spring segment located on the inside in circumferential direction is less than that of a spring segment located on the outside in circumferential direction.

The working portions serve as abutting portions or abutting surfaces for the friction linings. In particular, these are also designated as working surfaces. They are axially offset relative to one another so as to provide a working distance or a compression path for the friction linings arranged axially on opposite sides at the lining spring. The working distance is preferably provided by a bending portion between the two associated working surfaces. In particular, a spring segment can have a plurality of bending portions with the same working distances or with different working distances. In this respect, the order of action can possibly also be considered in direction of the bending portions instead of the spring segments.

During an axial compression, the friction lining can contact its associated working portion of the spring segment already from the outset or can contact it over the course of the axial compression. As the compression continues, the working portions at the respective spring segment move toward one another in axial direction to apply a spring force via bending portions or bending edges located therebetween.

Initially, the spring segments with the largest working distance act on the lining spring, and the spring segments with the smaller working portions engage by degrees to provide a spring force. In a particularly advantageous manner, the spring segments located on the outside in circumferential direction have the largest working distance between their first working portion and second working portion so that they act first, particularly before a spring segment arranged in the center in circumferential direction. The above-mentioned advantages are achieved in this way.

In an advantageous manner, fastening openings for fastening a friction lining are formed only at one individual spring segment of the lining spring.

The fastening openings are advantageously formed particularly at the working portions at the spring segment whose working portions have the greatest working distance. In particular, at least one fastening opening is, advantageously two fastening openings are, formed at the first working portion for a first friction lining. Also, at least one fastening opening is, advantageously two fastening openings are, formed at the second working portion for the second friction lining. The fastening openings are used for fastening elements, particularly a rivet which fixedly connects the friction lining to the respective working portion of the spring segment. A fastening of the friction lining by this small quantity of rivets and at only one spring segment is completely sufficient because they merely provide a holding function. As soon as the clutch is closed and the friction linings are accordingly acted upon axially opposite the lining spring, the normal force increases so that the friction serves for, and also suffices for, a secure fastening, in particular a fixed arrangement in circumferential direction at the respective spring segment.

In addition, by using a small quantity of fastening openings for fastening the friction linings to the lining spring, particularly to only one individual spring segment, the options for configuring the further spring segments are substantially increased.

It is further proposed that at least one fastening opening is formed at the first working surface of the spring segment and a fastening opening is formed at the second working surface of the spring segment.

The fastening openings are advantageously formed at the spring segment at which the working surfaces have the greatest working distance.

Accordingly, the friction linings or friction lining are not axially preloaded or deformed in a wavy manner by adjacent spring segments. The friction linings substantially retain their circular shape at the clutch disk.

It is further proposed that a bending line of the spring segment extends in radial direction.

In particular, this radially extending bending line is formed at the spring segment with the fastening openings for the friction linings. During an axial compression, the fastening openings at the first working portion of the spring segment are displaced in circumferential direction compared with the fastening openings at the second working portion. Accordingly, during the compression of the lining spring the fastening openings remain on the radius thereof. In particular, a radial clamping of one of the friction linings is effectively prevented in this way. Bending line extending substantially in radial direction.

A radially extending cutout is advantageously formed between two spring segments which are arranged adjacent to one another in circumferential direction.

This radially extending cutout makes it possible to effectively separate the spring portions from one another so that when one of the spring segments is compressed, the adjacent spring segments are not affected, for example, preloaded.

In a further embodiment, the end of the cutout on the supporting portion side is drop-shaped, and the drop shape is flat at a circumferential side and relatively bulge-shaped at the opposite circumferential side.

In particular the drop shape is formed asymmetrically. In other words, one circumferential side has a large radius and the opposite circumferential side has a relatively smaller radius. The radius can decrease or increase continuously along a contour of the drop shape of the cutout. The contour of the drop-shaped cutout extends continuously in a substantially circular basic contour with variable circle radius.

A torsional force acts on a spring segment in circumferential direction and a spring force acts on the spring segment in axial direction, both forces being introduced into the lining spring through the friction linings. This torsional load and spring load lead to increased stresses, particularly at a bending line of the spring portion and at the ends of the cutout on the supporting portion side. As a result of the drop shape, stress-related load points of the spring portions in particular are displaced away from one another proceeding from the torsion and the bending line so that the bending load is distributed substantially better over a larger area at the end of the cutout on the supporting portion side as a result of the drop shape.

In a particularly advantageous manner, a spring segment has bending lines extending substantially radially or in circumferential direction. A bending line can also be formed so as to extend obliquely, diagonally, or radially and in circumferential direction. The bending lines may be formed in a straight line or circularly, inter alia.

In particular, the friction lining can be prevented from clamping by the radially extending bending lines. Bending lines extending in circumferential direction allow higher spring forces, and circularly extending bending lines exert a comparatively higher spring constant or higher spring force than with straight bending lines.

In a particularly advantageous manner, the lining spring is treated by a heat setting process so that the individual spring segments do not settle further or settle only minimally over the life of the lining spring and the spring force remains essentially unchanged.

BRIEF DESCRIPTION OF THE DRAWINGS

The clutch disk and the lining spring will be described in detail with reference to the drawings in which.

DETAILED DESCRIPTION OF THE PRESENTLY PREFERRED EMBODIMENTS

Figure 1:
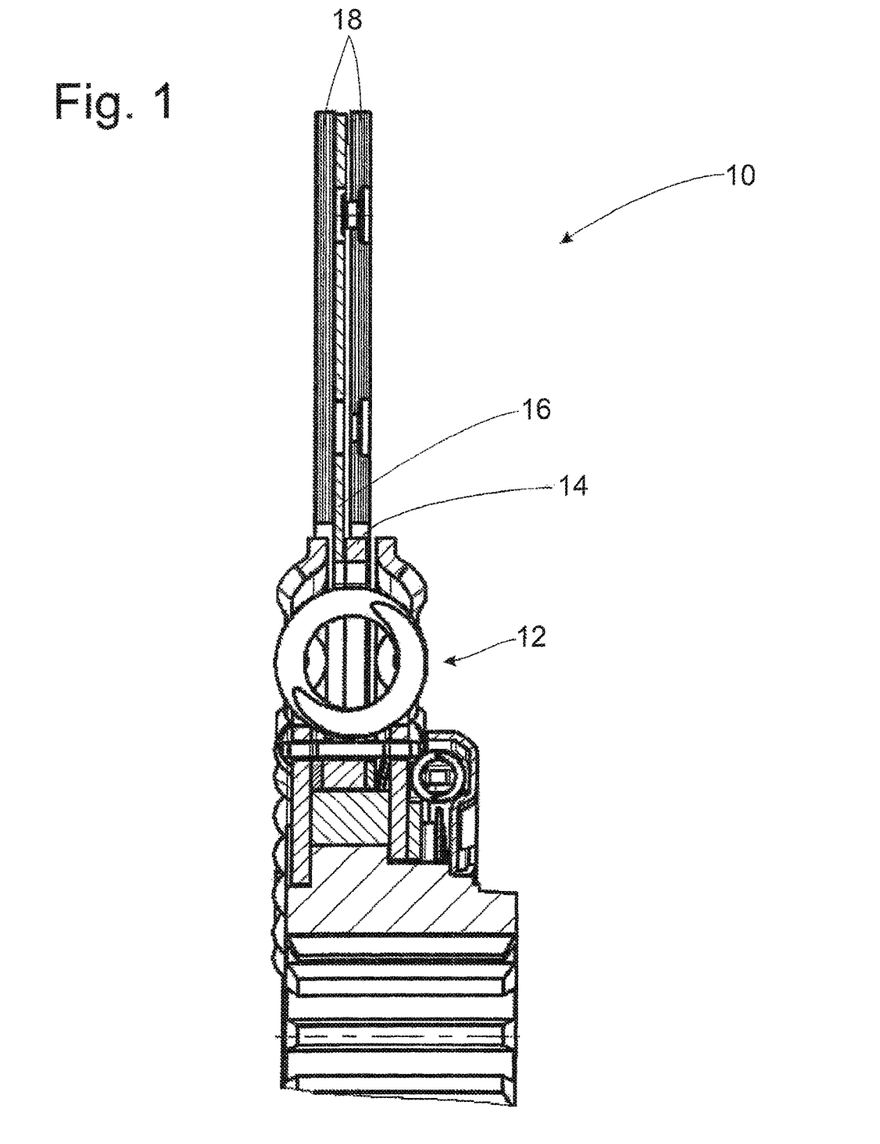
FIG. 1 shows a clutch disk in cross section.

FIG. 1 shows a clutch disk 10 with a torsion damper 12 in cross section. The clutch disk 10 has a drive carrier disk 14, a plurality of lining springs 16 and two friction linings 18. As regards its basic construction, the clutch disk 10 corresponds to the embodiments, already known, for clutch disks with torsion dampers. The torsion damper 12 is optional.

Figure 2:
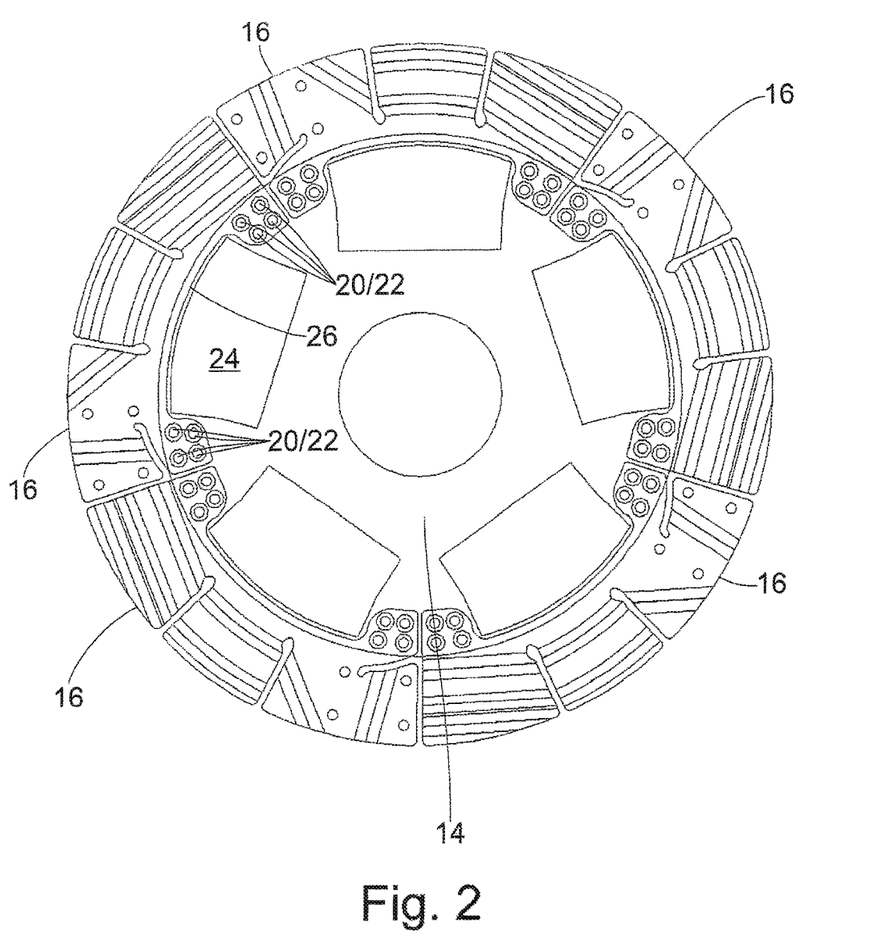
FIG. 2 shows a drive carrier disk with a plurality of lining springs from the clutch disk in FIG. 1.
Figure 3A:
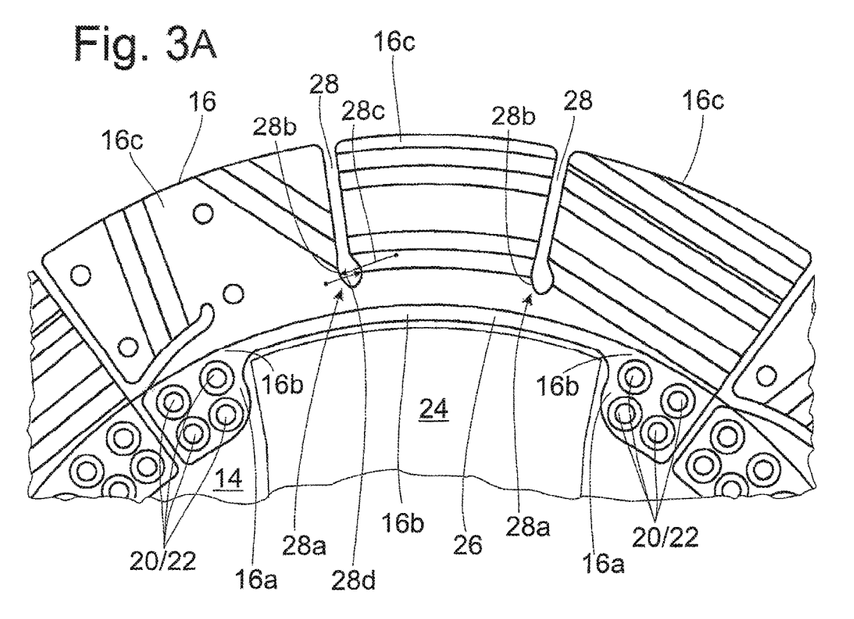
FIG. 3A is an enlarged view of FIG. 2.

The drive carrier disk 14 and the lining springs 16 are shown again in a top view in FIG. 2. FIG. 3A shows an enlarged view of FIG. 2. Five lining springs 16 are fixedly connected at the drive carrier disk 14 via fastening element, particularly rivets 20.

The lining spring 16 has a fastening portion 16a, a supporting portion 16b and a plurality of spring segments 16c. The fastening portion serves to fasten the lining spring 16 to the drive carrier disk 14. In this embodiment, the lining spring 16 has two fastening portions 16a, each of which forms four fastening openings 22. The fastening element 20 extend through the fastening openings 22 of the lining spring and corresponding fastening openings of the drive carrier disk 14. Through the use of four fastening elements or rivets 20, enhanced security against failure and, in addition, a better distribution of the force introduced on the drive carrier disk is achieved.

The fastening portions 16a are arranged in each instance radially inwardly at the lining spring 16 at the circumferential ends, and fastening portions 16a overlap with the drive carrier disk 14. Further, the fastening portions 16a are formed at the lining spring 16 so as to be adjacent on the circumference side to a spring window 24 of the torsion damper 12. The spring window 24 is intended to receive a spring element of the torsion damper 12. The two fastening portions are formed opposite one another in circumferential direction at a spring window 24. The fastening portions 16a are connected to one another at the lining spring 16 via the supporting portion 16b. This supporting portion serves, in addition, to connect the spring segments 16c to the fastening portions 16a.

Supporting portion 16b is formed radially outside of the spring window 24 and runs radially outside of the spring window 24. In particular, a torsional effect on the lining spring 16 is reduced substantially by arranging the fastening portions 16a so as to be spaced apart in circumferential direction.

The spring window 24 is limited radially outwardly by a web 26. The web is overlapped by the supporting portion 16b completely in circumferential direction and at least partially in radial direction. As a result of this overlapping, the lining spring can support forces acting axially on the spring segments 16c substantially better opposite the drive carrier disk 14. In particular, a sagging or buckling of the lining spring 16 is prevented. It will be seen that the radial overlapping corresponds to approximately two thirds of the web 26, but at least to fifty percent of the web 26.

Figure 4:
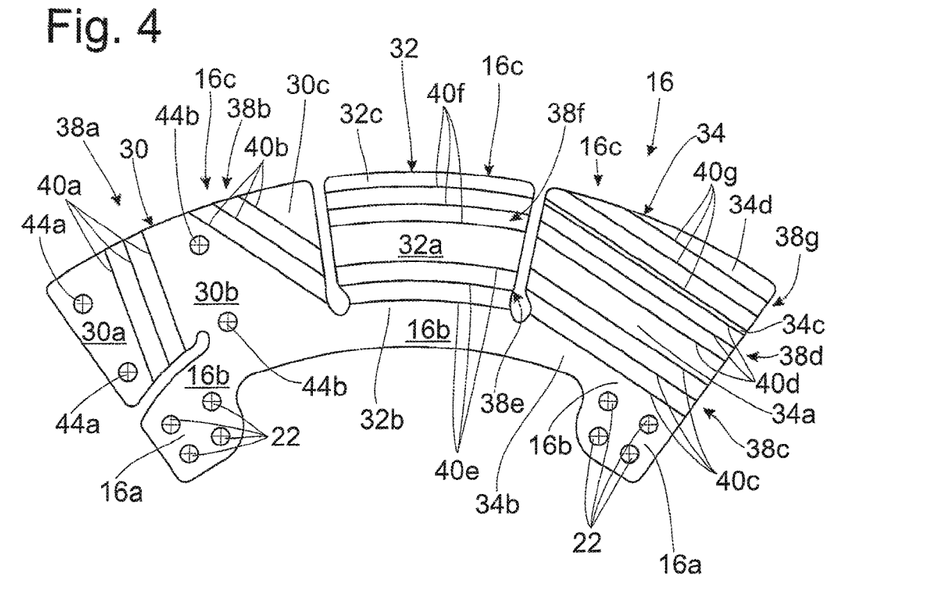
FIG. 4 shows a lining spring according to FIG. 3B.

The lining spring 16 is shown again in FIG. 4 as an individual part. It will be seen that the lining spring 16 has three spring segments 16c. These spring segments 16c are arranged adjacent to one another in circumferential direction and so as to be connected to one another via the supporting portion 16b and are divided or separated from one another via cutouts 28.

The spring segments 16c are referred to hereinafter as first spring segment 30, second spring segment 32 and third spring segment 34. The first spring segment 30 and the third spring segment 34 are formed on the outer side in circumferential direction, the second spring element 32 is arranged in circumferential direction between the first spring segment 30 and the third spring segment 34 and is referred to as located on the inside in circumferential direction.

The three spring segments 30, 32, 34 are connected to one another via the supporting portion 16b. Spring segments 30, 32, 34 act in consecutive sequence during an axial compression of the friction linings 18. The first spring segment 30 acts first, followed subsequently by the third spring segment 34 and lastly by the second spring element 32. This means that initially the first spring segment 30, then the third spring segment 34 and lastly the second spring segment 34 exert an axial force on the friction linings 18.

The spring segments 30, 32, 34 form working surfaces which cooperate with a respective contact surface of the friction linings 18. The friction linings 18 form contact surfaces 36 at their side facing the lining spring 16. The friction lining 18a with its contact surface 36a is arranged on a transmission side in the installed condition of the clutch disk, the friction lining 18b with its contact surface 36b is arranged on the engine side.

The first spring segment forms a first working surface 30a which faces contact surface 36a of friction lining 18a. Further, the first spring segment 30 forms a second working surface 30b which is associated with the contact surface 36b of friction lining 18b. The first working surface 30a and the second working surface 30b form an axial offset which is shown schematically in FIG. 5. The axial offset between two working surfaces is provided by a bending portion 38 with bending lines or bending edges 40 and is designated as working distance 42. In particular, between working surfaces 30a and 30b, this is bending portion 38a and bending lines 40a. According to FIG. 5, the various working surfaces of spring segments 16c and 30, 32, 34, respectively, are arranged so as to be structured in planes to which Roman numerals I-VI are assigned.

Figure 5:
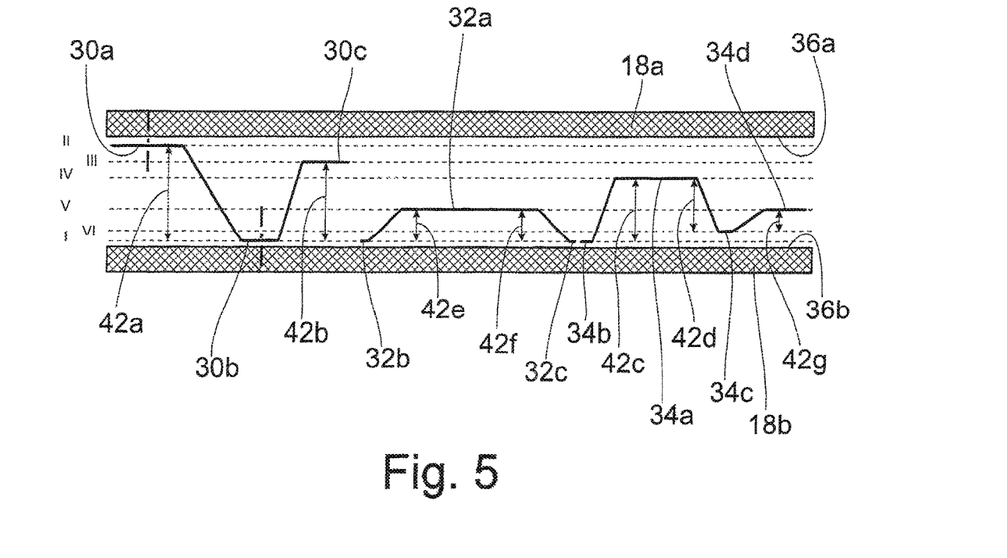
FIG. 5 shows an axial arrangement of working portions of the lining spring from FIG. 4 relative to one another.

Working surface 30a is located on plane II and working surface 30b is located on plane I. A working distance 42a is provided in this way. Working distance 32a is the largest so that bending portion 38a exerts a first force component during an axial compression.

A spring segment advantageously has three or more working surfaces and at least two bending portions.

Further, the first spring segment has a third working surface 30c which is arranged on a plane III and has a working distance 42b which is smaller than working distance 42a. During a continued compression of the friction linings 18, bending portion 38b acts with its bending lines 40b after a delay relative to bending portion 38a.

With further compression of the friction linings 18, the working surface 34a comes in abutting contact with contact surface 36a, while working surface 34b is already in abutting contact with contact surface 36b. Accordingly, a bending portion 38c acts with its bending lines 40c. Working distance 42c is reduced still further relative to working distance 42b.

As the compression proceeds, a working surface 34c of the third spring segment 34 makes abutting contact with contact surface 36b of the friction lining. A bending portion 38d with bending lines 40d is activated in this way. Working distance 42d is reduced relative to working distance 42c. It will be seen that bending portions 38 come into effect depending on working surfaces associated with them with decreasing working distance 42.

Working surface 34a is arranged on plane IV, working surface 34b is arranged on plane I, working surface 34c is arranged on plane VI and working surface 34d is arranged on plane V.

Over the course of further compression, working surface 32a comes in contact with contact surface 36a of the friction lining 18a on the transmission side. Working surfaces 32b and 32c of the second spring segment 32 lie on plane I and are connected to or arranged at contact surface 36b of friction lining 18b from the outset and permanently. Bending portions 38e and 38f with bending lines 40e and 40f act simultaneously because of the same plane arrangement of working surfaces 32b and 32c. Working distance 42e and working distance 42f are identical.

The last to act is bending portion 38g which is formed between working surfaces 34c and 34d with its bending lines 40g. Working distance 42g is the smallest compared with the other working distances.

It will be seen that the individual spring segments 30, 32 and 34 with their bending portions 38 successively provide an active force. In particular, each of the bending portions has its own spring constant. The spring constants of the bending portions acting initially are lower than those which follow. The curve of the spring constants may be described essentially as rising. In this way, an initial flat rise in force is reached which increases progressively and finally rises steeply so as ultimately to transmit a large engine torque.

The spring segment 30 located on the outside in circumferential direction acts first, followed by the third spring segment 34 located on the outside in circumferential direction and lastly by the second spring segment 32 located on the inside in circumferential direction. It will further be seen that bending lines 40a, 40b, 40c, 40d, 40g are formed in a straight line, and bending lines 40e and 40f are curved in a circular manner. Accordingly, a substantially increased spring constant is provided which makes it possible to transmit the high engine torque.

In particular, a torsional effect on the lining spring 16 can be transmitted to the fastening portions 16a substantially better as a result of the incipient force transmission through the spring segments located on the outside in circumferential direction, and the load on the supporting portion 16b is minimized. This supporting portion 16b would be more heavily loaded, for example, if the spring segment 32 arranged in the middle in circumferential direction were the first to act at the start of the transmission of force.

Friction lining 18 is only fastened to the first segment 30 via fastening element, particularly rivets, which engage in fastening openings of the friction lining 18 and in fastening openings 44a and 44b of the first spring segment 30. Fastening openings 44a are arranged at the first working surface 30a, and the second fastening openings 44b are arranged at the second working surface 30b. Bending portion 38a has radially extending bending lines 40a. In this way, during compression of the friction linings in axial direction an offset of friction lining 18a relative to friction lining 18b is achieved, which offset extends in circumferential direction. The lining is rotated in circumferential direction as a result of the offset extending in circumferential direction and accordingly does not experience any radially outwardly directed tension. Fastening openings 44 are formed only at the first spring segment 30 so that a holding function is realized and the further spring segments can be configured in a substantially freer and more optimal manner. This holding function is entirely sufficient because a fastening through the frictional force between the working surfaces of the lining spring and the contact surfaces of the friction linings is sufficiently high to effectively transmit the introduced force.

As has already been mentioned, the spring segments are separated from one another through radially extending cutouts 28. The cutouts 28 extending in radial direction are substantially drop-shaped at their end on the supporting portion side. This can be seen particularly clearly in FIGS. 3A and B. The drop-shaped portion 28a is flat on one side on the circumferential direction side and bulge-shaped on the opposite circumferential side. In particular, a radius 28c of contour 28b is greater than a radius 28d of the opposite circumferential side of contour 28b. This is shown again in an enlarged view in FIG. 3B.

Figure 3B:
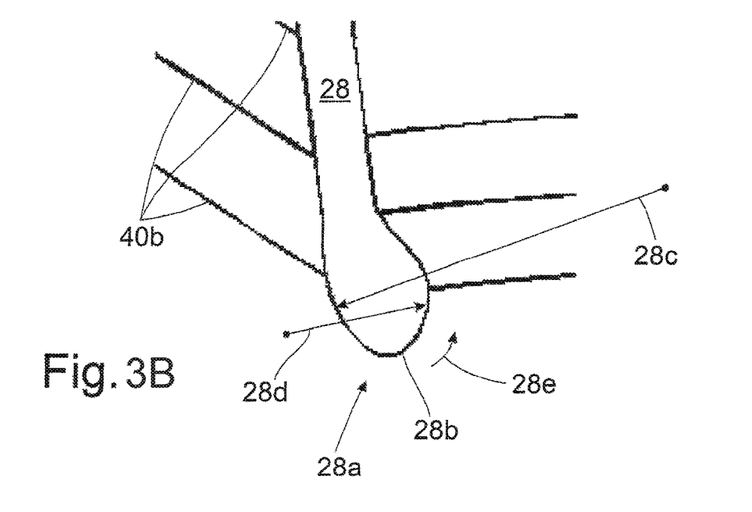
FIG. 3B is an enlarged view of FIG. 3A.

Running along the contour 28b, the radius can continuously increase or decrease in particular, for example, depending on the direction. The continuous change in radius can rise monotonically or fall monotonically in particular. In this way, particularly the points impinged by bending loading of the bending lines 40b and by a torsional loading of the spring portion are shifted away from one another so that the load on the individual point is reduced. Radius 28c, d decreases continuously along direction 28e. Values 28d and c are selected as examples for purposes of illustration.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCE CHARACTERS 10 clutch disk
12 torsion damper
14 drive carrier disk
16 lining spring
16a fastening portion
16b supporting portion
16c spring segment
18a,b friction lining
20 fastening means/rivet
22 fastening opening
24 spring window
26 web
28 cutout
28a drop-shaped portion
28b contour
28c,d radius
28e running direction
30 first spring segment
30a first working surface of the first spring segment
30b second working surface of the first spring segment
30c third working surface of the first spring segment
32 second spring segment
32a first working surface of the second spring segment
32b second working surface of the second spring segment
32c third working surface of the second spring segment
34 third spring segment
34a first working surface of the third spring segment
34b second working surface of the third spring segment
34c third working surface of the third spring segment
34d fourth working surface of the third spring segment
36a,b contact surface
38,a,b,c,d,e,f,g bending portion
40,a,b,c,d,e,f,g bending line
42,a,b,c,d,e,f,g working distance
44, a,b fastening opening
I,II,III,IV,V,VI planes

The invention claimed is:

1. A clutch disk (10) for a motor vehicle comprising: at least two axially opposed friction linings (18); at least one lining spring (16); and a drive carrier disk (14) comprising a spring window (24); wherein the at least one lining spring (16) has at least two fastening portions (16a), a supporting portion (16b) extending between the two fastening portions (16a) so as to run in a circumferential direction and a plurality of spring segments (16c) arranged adjacent to one another in the circumferential direction; the spring segments (16c) are arranged radially outside at the supporting portion (16b) of the lining spring (16), and the at least two fastening portions (16a) are arranged radially inside at the supporting portion (16b) and the two fastening portions are opposite one another in the circumferential direction at the spring window (24) and the at least two fastening portions (16a) circumferentially align with the spring window (24).

2. The clutch disk (10) according to claim 1, wherein the supporting portion (16b) is arranged radially outwardly at the spring window (24).

3. The clutch disk (10) according to claim 1, wherein the at least two fastening portions (16*a*) have at least two fastening openings (22) for receiving a fastening element (20).

4. The clutch disk (10) according to claim 3, wherein the spring window (24) of the drive carrier disk (14) is bounded radially outwardly by a web (26), and wherein the supporting portion (16*b*) of the lining spring (16) covers the web (26) at least partially in radial direction.

5. The clutch disk (10) according to claim 4, wherein the supporting portion (16*b*) overlaps the web (26) by at least fifty percent of the web, by two thirds of the web, or completely overlaps the web.

6. The clutch disk (10) according to claim 3, wherein each of the at least two fastening portions have four fastening openings.

7. The clutch disc according to claim 1, wherein the two fastening portions (16*a*) are located at the lining spring (16) so as to be adjacent on the circumference side to the spring window 24.

\* \* \* \* \*